United States Patent Office 3,446,588
Patented May 27, 1969

3,446,588
METHOD FOR PREPARING LITHIUM PEROXIDE
William Novis Smith, Jr., Exton, Pa., assignor to Foote Mineral Company, Exton, Pa., a corporation of Pennsylvania
No Drawing. Filed Mar. 2, 1967, Ser. No. 619,919
Int. Cl. C01d 11/02
U.S. Cl. 23—184                                    8 Claims

ABSTRACT OF THE DISCLOSURE

Lithium hydroxide and hydrogen peroxide are reacted and the reaction mixture is heated during the endothermic reaction stage and filtered at a temperature of at least 70° C. to provide high yields of solid, high purity lithium peroxide.

---

The preparation of lithium peroxide from lithium hydroxide (generally using the monohydrate $LiOH \cdot H_2O$) and aqueous hydrogen peroxide is well known. The general overall reaction equation may be written as:

$$2LiOH \cdot H_2O + H_2O_2 \cdot XH_2O \rightarrow Li_2O_2 + (X+4)H_2O$$

However, the reaction takes place in two stages, an exothermic stage:

$$LiOH \cdot H_2O + H_2O_2 \cdot XH_2O \rightarrow LiOOH + (X+2)H_2O$$

and an endothermic stage:

$$LiOH \cdot H_2O + LiOOH \rightarrow Li_2O_2 + 2H_2O$$

The classical method for preparing lithium peroxide using the foregoing reactants involves reacting the lithium hydroxide with a large excess of aqueous hydrogen peroxide with cooling to maintain the temperature at about 20° C. and immediately beginning the removal of water by evaporation under vacuum. (Inorganic Synthesis, vol. 5, page 1, McGraw-Hill Company, 1957.) This procedure is expensive and time-consuming, requiring about 24 hours to remove the large amount of water. Other methods involve the azeotropic distillation of the water from the reaction mixture using an organic liquid (U.S. Patents Nos. 3,147,075 and 2,488,485). Patent No. 3,212,850 relies on an alcohol to precipitate the lithium peroxide, and Patent No. 3,185,546 relies on excess lithium hydroxide (the more expensive reactant) or an alcohol or both to depress the solubility of the lithium peroxide in the reaction mixture. Patent No. 3,134,646 involves spray drying of the reaction mixture.

It is the principal object of the present invention to provide an improved method for preparing lithium peroxide.

It is another object of the present invention to provide a simple, inexpensive method for preparing high purity lithium peroxide in high yields from lithium hydroxide and hydrogen peroxide.

It is a further object of the present invention to provide an improved method for preparing lithium peroxide from lithium hydroxide and aqueous hydrogen peroxide which does not require any large excess of aqueous hydrogen peroxide, any excess of lithium hydroxide, the use of extraneous organic liquids, spray drying or large amounts of heat to remove water.

Other objects will become apparent from a consideration of the following specification and claims.

The method of the present invention comprises mixing lithium hydroxide and an aqueous solution of hydrogen peroxide, in proportions of 2 moles of the former to from 1 to 1.25 moles of the latter, applying heat to the reaction mixture during the endothermic reaction stage to provide a temperature of at least 70° C., filtering lithium peroxide from said reaction mixture at essentially the end of said endothermic reaction stage at a said tempertaure of at least 70° C. and drying the moist lithium peroxide so recovered.

By the method of the present invention high yields (up to about 92%, by weight, based on the lithium hydroxide) of highly pure (up to about 98%) lithium peroxide can be obtained in a simple, direct, inexpensive manner. Once the reactants, in the stated proportions, are mixed, no further amount of either reactant nor any other material, such as an organic liquid, need be added to the reaction mixture. Simple mixing, heating and filtering are the only required steps and the final removal of moisture from the resulting moist lithium peroxide presents no burdensome problem as compared, for example, to the evaporation or distillation of all of the water in the reaction mixture. The efficiency of the present method is surprising in view of the known instability, in water, of lithium hydroperoxide (LiOOH) and lithium peroxide, the latter tending to reconvert to the former in the presence of water. It is believed that one of the principal features of the present method is the acceleration, by the application of heat, of the second, endothermic, reaction stage to the more stable lithium peroxide and the substantially immediate separation of the lithium peroxide from the aqueous reaction medium at a temperature at which substantially all of the lithium peroxide is in suspension in the reaction mixture.

The first main step of the present method is the mixing of the lithium hydroxide and an aqueous solution of hydrogen peroxide. The lithium hydroxide may be added to the aqueous hydrogen peroxide, or the latter may be added to the former. Agitation of the materials, as by stirring, is used to facilitate mixing. The proportions used may be substantially stoichiometric, that is 2 moles of lithium hydroxide and 1 mole of hydrogen peroxide, although a small excess, up to 25%, of the latter may be used. Anhydrous lithium hydroxide (LiOH) may be used, although the more convenient monohydrate $$(LiOH \cdot H_2O)$$

is preferred. The lithium hydroxide is preferably in solid form when mixed with the aqueous hydrogen peroxide, although it may be predissolved in water and the resulting solution mixed with the aqueous hydrogen peroxide. The hydrogen peroxide used will be in the form of an aqueous solution, and the concentration of the hydrogen peroxide in such solution may range from about 30 to about 90%, by weight, with a preferred concentration of from about 50 to about 70%.

It will be noted from the foregoing that water is introduced to the reaction mixture as solvent for one or both of the reactants, as water of hydration when lithium hydroxide monohydrate is used and as a by-product of the reaction. Giving consideration to the amount of water desired for the reaction to proceed, on the one hand, and the fact that all the water must eventually be removed, on the other hand, it may be said that the total water in the reaction mixture should be at least about 2 moles thereof per mole of lithium peroxide and preferably does not exceed about 5 moles on the stated basis.

Mixing of the lithium peroxide and the aqueous hydrogen peroxide initiates the reaction which is directly manifested by an evolution of heat and consequent rise in temperature. Where the reactants individually are initially at ambient temperature, which is normally the case, the temperature of the reaction mixture may rise to 40–80° C. depending, for example, upon the size and nature of the mixing apparatus, the amount of water present and the rapidity with which one reactant is added to the other. This rise in temperature is accompanied by an increase in the viscosity of the reaction mixture by virtue of the precipitation of white lithium hydroperoxide. Within a matter of minutes the exothermic stage is substantially completed and the endoethermic stage manifests itself by a levelling off of the temperature and, in the absence of application of heat, a sharp decline in temperature.

According to the present method heat is applied to the reaction mixture during the endothermic stage so that at least by the end thereof the temperature of the mixture is at least 70° C. Heat may be begun to be applied before the exothermic stage is completed so that there is no sharp drop in temperature, or there may may be a sharp drop in temperature, say back to 30–40° C., before the effect of the added heat is seen by a reversal of the temperature decline and a temperature rise. At any rate, by the time the endothermic stage is essentially complete the temperature of the reactiotn mixture, according to the present method, will be a least 70° C., and preferably at least 80° C., especially at the boiling point. The endothermic stage is accompanied by a decrease in the viscosity of the reaction mixture as the lithium hydroperoxide becomes converted to pale tan lithium peroxide. The levelling off of the viscosity as it reaches a minimum denotes the substantial end of the endothermic stage and the substantial completion of the reaction.

With the reaction mixture at the above-stated elevated temperature and when the reaction is essentially complete, the lithium perovide is filtered from the reaction mixture. Pressure or suction may be used to facilitate filtering. Centrifuging is considered to be the equivalent of filtering and is included herein within the latter term where reference is made thereto.

Following filtering, the moist lithium peroxide is dried. Drying preferably takes place under the influence of heat, as by heating the material to form about 90 to about 140° C., and preferably also under a vacuum. In this way, the lithium peroxide can be essentially freed of remaining moisture in from 6 to 12 hours.

The following examples are given to illustrate the invention and are not to be considered as limiting the scope of the invention in any way.

Example 1

To 545.6 g. (4.36 moles) of 30.3% aqueous hydrogen peroxide in a reaction flask equipped with a stirrer and thermometer were slowly added 395 g. (9.40 moles) of lithium hydroxide monohydrate over a period of 15 minutes during which the temperature rose to about 40° C. Then the mixture was heated to 101° C. and filtered immediately. The moist material was then dried at 120° C. under a vacuum of about 0.5–1 mm. Hg. This provided 177 g. (83% yield based on the lithium hydroxide) of lithium peroxide having a purity of 97.5%.

Example 2

To 332 g. (4.93 moles) of 50.5% aqueous hydrogen peroxide in a reaction flask equipped with a stirrer and a thermometer were slowly added 397 g. (9.46 moles) of lithium hydroxide monohydrate over a period of about 15 minutes. The temperature rose to 40° C. Then the mixture was heated to 100° C. and filtered immediately. The moist material was then dried at 110° C. under a vacuum of about 0.5–1 mm. Hg. The yield was 179 g. (83% based on the lithium hydroxide) of lithium peroxide having a purity of 97%.

Example 3

To 174 g. (2.58 moles) of 50.5% aqueous hydrogen peroxide in a reaction flask equipped with a stirrer and a thermometer were added 208 g. (4.96 moles) of lithium hydroxide monohydrate over a period of 10–15 minutes. The temperature rose to 60° C., and the mixture was then heated to 99° C. and filtered immediately. The damp product was dried at 110° C. under a vacuum of 0.5–1 mm. Hg. The yield was 100 g. (88% based on the lithium hydroxide) of lithium peroxide having a purity of 96%.

Example 4

To 182 g. (3.76 moles) of 70.0% aqueous hydrogen peroxide (5% excess) in a reaction flask equipped with a stirrer and a thermometer were added 299 g. (7.12 moles) of lithium hydroxide monohydrate over a period of 10–15 minutes. The temperature rose to 65° C. during the mixing and after the addition was complete, the mixture was heated to 99° C., cooled to 97° C. because of foaming and filtered at 97° C. The damp product was dried as previously to provide 140 g. (86% yield based on the lithium hydroxide) of lithium peroxide having a purity of 97%.

Example 5

To 160 g. (3.29 moles) of 70.0% aqueous hydrogen peroxide (20% excess) in a reaction flask equipped with a stirrer and a thermometer were added 230 g. (5.48 moles) of lithium hydroxide monohydrate over a period of 10–15 minutes. The temperature rose to 65° C. during the mixing and after the addition was complete the mixture was heated to 101° C. and filtered at 98° C. The product was dried as previously to provide 112 g. (89% yield based on the lithium hydroxide) of lithium peroxide having a purity of 98%.

Example 6

To 130 g. (1.93 moles) of 50.5% aqueous hydrogen peroxide (4% excess) in a reaction flask equipped with a stirrer and a thermometer were added 156 g. (3.72 moles) of lithium hydroxide monohydrate over a period of 10–15 minutes. The temperature rose to 55° C. during the mixing and after addition was complete the mixture was heated to 98° C. for 20 minutes and filtered. The material was dried as previously to provide 75.0 g. (89% yield based on the lithium hydroxide) of lithium peroxide having a purity of 96%.

Example 7

To 191 g. of 70% aqueous hydrogen peroxide in a reaction flask equipped with a stirrer and a thermometer were rapidly (about ½ minute with stirring) added 315 g. of lithium hydroxide monohydrate. The temperature rose to 80° C. as the slurry thickened. Then the temperature dropped rapidly to 40° C. with thinning of the slurry at which time heat was applied raising the temperature to reflux. The mixture was immediately filtered and the damp material dried as previously. The yield was 147.7 g. (86% based on the lithium hydroxide) of lithium peroxide of 95.7% purity.

Example 8

To 166.5 g. of 70% aqueous hydrogen peroxide (5% excess) in a reaction flask equipped with a stirrer and a thermometer were rapidly, as in Example 7, added 274 g. of lithium hydroxide monohydrate. The temperature nose to 68° C. and fell to about 45° C. before heating brought it back up to 70° C. The mixture was immediately filtered at 70° C. and dried as previously to provide 134 g. (91% yield based on the lithium hydroxide) of lithium peroxide having a purity of 95.6%.

Example 9

To 171.2 g. of 70% aqueous hydrogen peroxide in a reaction flask equipped with a stirrer and a thermometer were added, in about ¼ minute with stirring, 296.5 g. of lithium hydroxide monohydrate. The temperature rose to about 60° C. and fell to about 40–45° C. before heating brought it back to reflux where it was filtered. The material was dried as previously to provide 147.5 g. (91% yield based on the lithium hydroxide) of lithium peroxide having a purity of 96%.

Example 10

Into a reaction flask, equipped with a stirrer and a thermometer, and containing 302 g. of lithium hydroxide monohydrate were poured 174.6 g. of 70% aqueous hydrogen peroxide. The temperature rose to 65° C. and fell to 40° C. before being heated back up to reflux where it was filtered. The material was dried as previously to give 150.4 g. (92% yield based on the lithium hydroxide) of lithium peroxide having a purity of 96.8%.

Modification is possible in the particular procedural techniques and conditions employed without departing from the scope of the invention.

What is claimed is:

1. The method for preparing lithium peroxide which comprises mixing lithium hydroxide and an aqueous solution of hydrogen peroxide, in proportions of 2 moles of the former to from 1 to 1.25 moles of the latter, applying heat during the endothermic stage of the reaction to provide a temperature of at least 70° C., filtering lithium peroxide from the reaction mixture at essentially the end of said endothermic reaction stage and while the reaction mixture is at said temperature of at least 70° C., and drying the lithium peroxide so recovered.

2. The method of claim 1 wherein said reaction mixture is heated to at least 80° C.

3. The method of claim 1 wherein said reaction mixture is heated to reflux.

4. The method of claim 1 wherein the total water in the reaction mixture is at least 2 moles but no more than about 5 moles thereof per mole of lithium peroxide.

5. The method of claim 1 wherein said aqueous solution of hydrogen peroxide has a concentration of hydrogen peroxide of from about 30% to about 90%.

6. The method of claim 1 wherein said aqueous solution of hydrogen peroxide has a concentration of hydrogen peroxide of from about 50% to about 70%.

7. The method of claim 1 wherein said aqueous solution of hydrogen peroxide has a concentration of hydrogen peroxide of from about 30% to about 90%; wherein the total water in said reaction mixture is at least 2 moles but no more than about 5 moles thereof per mole of lithium peroxide, and wherein the reaction mixture is heated to at least 80° C.

8. The method of claim 7 wherein said aqueous solution of hydrogen peroxide has a concentration of hydrogen peroxide of from about 50 to about 70%, and wherein the reaction mixture is heated to about reflux.

References Cited

UNITED STATES PATENTS

| | | | |
|---|---|---|---|
| 2,488,485 | 11/1949 | Winternitz | 23—184 |
| 3,134,646 | 5/1964 | Bach | 23—184 |
| 3,147,075 | 9/1964 | Bach et al. | 23—184 |
| 3,185,546 | 5/1965 | Bach et al. | 23—184 |
| 3,212,850 | 10/1965 | Klebba | 23—184 |

EDWARD J. MEROS, *Primary Examiner.*